United States Patent

[11] 3,603,242

| [72] | Inventor | James R. Murphy, Sr.<br>739 Palmer Ave., Maywood, N.J. 07607 |
|---|---|---|
| [21] | Appl. No. | 782,606 |
| [22] | Filed | Dec. 10, 1968 |
| [45] | Patented | Sept. 7, 1971 |

[54] TOASTER ATTACHED BUN WARMER
8 Claims, 4 Drawing Figs.

[52] U.S. Cl. .................................................. 99/339
[51] Int. Cl. ............................................. A47j 36/24, A47j 37/08
[50] Field of Search .......................................... 99/339, 340, 385; 126/376; 219/392, 393, 454

[56] References Cited
UNITED STATES PATENTS
| 2,517,320 | 8/1950 | Johnston | 126/376 |
| 2,659,295 | 11/1953 | Soccoli | 99/339 |
| 2,851,943 | 9/1958 | Smagula | 99/339 |
| 2,940,379 | 6/1960 | Kenney et al. | 99/339 |

*Primary Examiner*—Billy J. Wilhite
*Attorneys*—Clarence A. O'Brien, Harvey B. Jacobson and John J. Delaney ABSTRACT: A food warmer, primarily for buns, biscuits and the like, expressly designed and adapted for use atop the slotted top wall of the case of a bread slice toaster. It is characterized by (1) an openwork grid providing a bun seating and warming rack and (2) a complemental imperforate grid supported rack encompassing hood which can be united with or made separate from the grid. The hood can be made of one piece or provided with an applicable and removable lid.

PATENTED SEP 7 1971  3,603,242

James R. Murphy, Sr.
INVENTOR.

BY *Clarence A. O'Brien*
and *Harvey B. Jacobson*
Attorneys

TOASTER ATTACHED BUN WARMER

This invention relates to a bread toaster attachment, more particularly, an optionally usable food warmer which is unique in that it can be temporarily placed atop and in communicating alignment with the slotted top wall of the toaster housing or case in a manner to utilize the readily available heat source to effectually heat and warm buns, rolls, biscuits or the like.

As will be hereinafter evident from the overall disclosure, the warmer comprises a readily applicable and removable self-contained attachment which is such in design and construction that it does not require alteration of the toaster. It permits one to use the toaster in the usual way and, whenever necessary or desired, to temporarily position the warmer attachment atop the housing or case of the toaster so that the warm air issuing through the slice inserting and removing slots can be trapped in the hood and utilized for food warming purposes.

Briefly the attachment comprises an elongated openwork unit which is constructed to provide a horizontal flat-faced grid. The grid is preferably such in plan dimension that it will effectually overlie the slotted top plate of the toaster case. The marginal edge portions of the grid are provided with depending coplanar side and end flanges. These flanges slope downwardly and flare outwardly sufficiently that they straddle and rest upon the longitudinal and transverse edge portions of the toaster case. The lower edges of these flanges are bent outwardly and then directed upwardly in a manner to define troughlike receivers. In addition, the grid unit is provided interiorly with transverse longitudinally spaced stabilizing rods which are designed to rest atop the slotted plate of the case and to assist in retaining the grid unit in its given position. If desired the central rod may be and preferably is provided with clips which are such in construction that they reside in the slots of the top plate and facilitate placing and holding the grid unit against displacement particularly when the case is narrow compared to the fixed width of the grid. The grid unit provides a bun and roll positioning and seating rack. The companion hood may be of one piece construction or may comprise a pyramidal truncated type imperforate rim or shell and wherein the upper converging portions define an entrance and exit opening and serve to seat an attachable and detachable knob-equipped lid or cover.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 4:
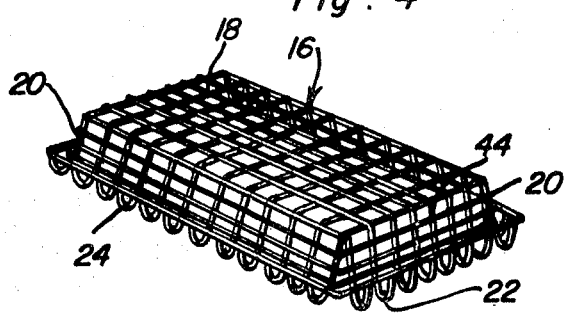

And FIG. 4 is a view in perspective of the openwork grid unit by itself.

As before suggested, it is not intended to alter or change the construction of the toaster. The toaster herein shown is denoted by the numeral 6 and is provided with the usual longitudinal sidewalls 8 and connecting transverse end walls 10. The substantially flat top wall is denoted at 12. The slice inserting and removing slots are denoted (FIGS. 2 and 3) by the numeral 14. The construction of the compartments and heating units is not detailed.

Figure 1:
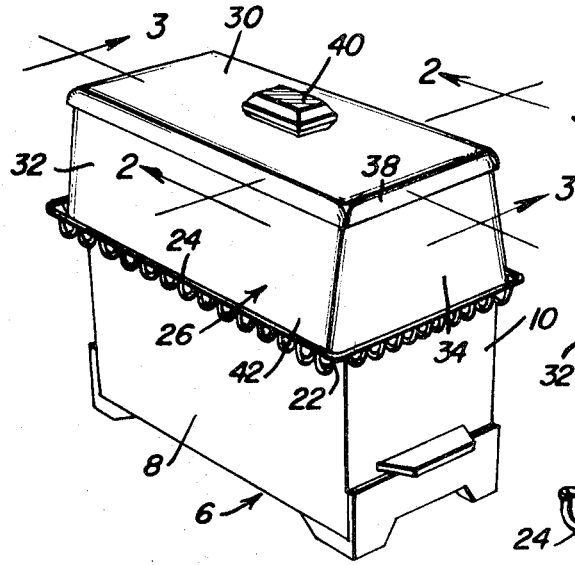
FIG. 1 is a view in perspective showing a conventional toaster with the improved warmer attachment constructed in accordance with the invention and applied for use.
Figure 2:
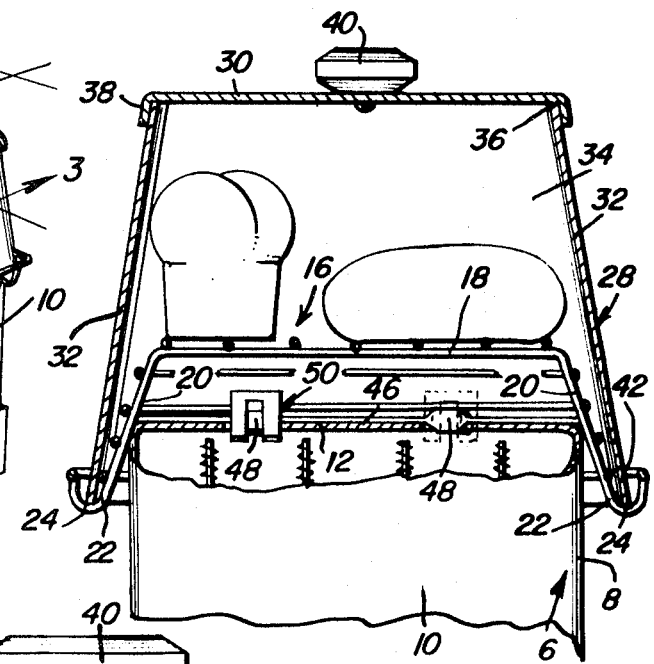
FIG. 2 is an enlarged fragmentary detail sectional view with parts in elevation taken approximately on the plane of the section line 2—2 of FIG. 1 looking in the direction of the arrows.
Figure 3:
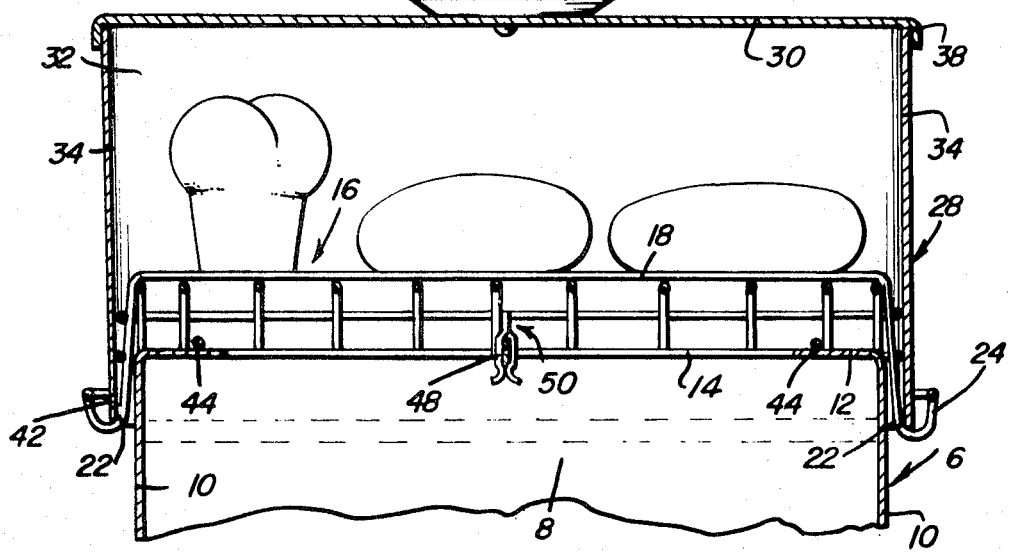
FIG. 3 is a central longitudinal sectional view taken approximately on the plane of the section line 3—3 of FIG. 1.

The self-contained readily applicable and removable warmer attachment can be constructed as a unit or can be made up of several component parts or units in the manner shown in FIG. 2. With respect first to the adapter unit or means this comprises an openwork grid designated (FIG. 4) by the numeral 16. The substantially flat-faced rectangular top portion of the unit is denoted at 18 and is preferably of an area and size to reside in alignment with and to substantially cover the slotted plate 12 of the toaster. The opposite longitudinal edge portions and transverse end portions are provided with outwardly and downwardly flaring or oblique-angled portions which are designated here as flanges 20. The lower edge portions of the respective flanges 20, that is, the edges 22 (FIG. 4) are bent upon themselves outwardly and then upwardly to provide lengthwise and crosswise troughlike receivers 24.

The hood is designated by the numeral 26 and while the hood and cover can be constructed and joined integrally with the grid unit 16 it is usually made up of two companion parts; namely, the substantially pyramidal truncated shell or rim 28 and a complemental cover, more specifically, an attachable and detachable lid 30. The upwardly converging longitudinal sidewalls of the hood are denoted at 32 and the vertical transverse end walls at 34. The upper open end portion 36 (FIG. 2) is covered by the lid or cover 30. This lid has marginal flanges 38 which are fittingly applied over the coacting portions of the walls 32 and 34. The numeral 40 designates an appropriate handgrip or knob. The lower edge portions of the walls 42 are seated in the troughlike receivers 24 and may be removable or joined (not detailed) thereto if desired.

In carrying out a preferred embodiment of the invention the grid unit 16 is provided with longitudinally spaced transverse rods the end rods being denoted at 44 and the central rod at 46 in FIG. 2. This rod 46 is provided with longitudinally spaced flattened portions 48 which are best shown in FIG. 2 and are lined up with the slots 14. These flattened portions serve to accommodate suitable clips 50 which are adapted to be snapped in place and which are constructed to fit down into the respective slots in the manner shown in FIG. 3. These rod supported clips assist in positioning the attachment and holding it in place and against displacement.

The manner in which the device is constructed and used is believed to be clear from the views of the drawing.

The foregoing is considered as illustrative only of the principles of the invention. Further, since numerous modifications and changes will readily occur to those skilled in the art, it is not desired to limit the invention to the exact construction and operation shown and described.

What is claimed as new is as follows:

1. In combination, a self-contained portable toaster embodying a case having enclosed heating and browning means and slice receiving slots opening upwardly and accessibly through a horizontal top wall of said case, readily applicable and removable adapter means comprising an openwork grid embodying a flat horizontal top portion spanning said top wall and said slots, said grid providing a bun and biscuit seating and warming rack, said top portion being of a dimension in plan commensurate with the areal dimension of the top wall of said case and having flanges, said flanges being flared outwardly and downwardly and being oblique to the horizontality of said rack and resting on coacting upper portions of the sidewalls of said toaster, said flanges being flared outwardly and downwardly and assuming sloping angles which are oblique to the horizontality of said rack, said flanges having lower longitudinal edges which are bent outwardly and directed upwardly in a manner to define troughlike hood locating and supporting receivers, and a bodily applicable and removable hood cooperable with said rack.

2. The combination defined in and according to claim 1, and wherein said hood comprises a hollow imperforate open-bottom rim, said rim providing an enclosure encompassing said rack and having complemental walls with upper edges projecting to a level above the level of said rack, and lower edges removably seated and nested in said receivers.

3. The combination defined in and according to claim 1, and wherein the walls of said rim slant and converge upwardly and provide an entrance and exit opening, and a readily applicable and removable lid seated atop the upper edges of said walls and providing a heat confining cover, said lid having a top surface provided with handling means.

4. For use atop the case of a bread toaster, a readily applicable and removable bun warmer comprising an elongated openwork grid embodying a horizontal flat-faced top portion of a size and shape that it is capable of spanning the top wall and slice inserting and removing slots of the top wall of said case, said top portion providing a seating and warming rack and having integral flanges coextensive in length with the respective longitudinal and transverse edges of said grid and disposed in coplanar relationship and being adapted to straddle and cooperate with cooperating supporting surface portions of said case, longitudinally spaced brace rods joined to and transversely bridging the space between certain ones of said flanges, said rods being capable of resting for support atop said top wall, and a hood oriented and cooperatively associated with and enclosing said grid.

5. The warmer defined in and according to claim 4, and wherein said flanges are flared outwardly and assume sloping angles which are oblique to the horizontality of said rack, said flanges having lower longitudinal edges bent outwardly and directed upwardly in a manner to define troughlike hood locating receivers.

6. The warmer defined in and according to claim 5 and wherein said hood comprises a hollow imperforate open-bottom rim, said rim providing an enclosure around and projecting to a level above the level of said rack and including opposed sidewalls having lower longitudinal edges seated and nested in said receivers.

7. For use atop the case of a bread toaster, a readily applicable and removable bun warmer comprising a wire grid embodying a top portion of an area adapted to span the usual slotted top wall of said case and which serves to provide a readily accessible food warming rack, said top portion having depending marginal openwork wire flanges which are adapted to cooperate with coordinating portions of said case in a manner to assist in positioning and retaining said grid in a given position, and a bodily applicable and removable hood complemental to and adapted to enclose said grid, said hood having depending walls, said flanges having lower edges providing hood locating and supporting receivers for the coacting insertable and removable lower edges of said walls.

8. The bun warmer defined in and according to claim 7, and, in combination a plurality of spaced coplanar brace rods bridging the space between and integrally joined to predetermined flanges and designed and adapted to rest atop the top wall of said case.